United States Patent

[11] 3,617,299

[72] Inventors Richard W. Mattoon
 Lake Forest;
 Lowell R. Macy, Lake Bluff, both of Ill.
[21] Appl. No. 859,243
[22] Filed Sept. 15, 1969
[45] Patented Nov. 2, 1971
[73] Assignee Abbott Laboratories
 North Chicago, Ill.

[54] ANIMAL FEED PREMIX RESISTANT TO STATIC CHARGE AND METHOD OF MAKING SAME
 13 Claims, No Drawings

[52] U.S. Cl. .................................................. 99/2 R,
 99/11, 99/166, 424/31, 99/2 VM
[51] Int. Cl. ...................................................... A23k 1/17
[50] Field of Search............................................ 99/83, 80,
 11, 166, 2; 260/442; 424/31, 227, 271, 80, 297;
 117/139.5 CQ

[56] References Cited
 UNITED STATES PATENTS

| | | | |
|---|---|---|---|
| 2,674,534 | 4/1954 | Carter ........................... | 99/166 |
| 2,694,012 | 11/1954 | Washburn ..................... | 99/83 X |
| 2,924,524 | 2/1960 | Martin........................... | 99/2 |
| 3,184,316 | 5/1965 | Doan et al. ................... | 99/83 |
| 3,484,250 | 12/1969 | Vollink et al. ................ | 99/83 |
| 3,507,665 | 4/1970 | Henthorn ...................... | 99/166 |
| 2,890,980 | 6/1959 | Hotchkiss et al. ............ | 424/31 X |

FOREIGN PATENTS

| | | | |
|---|---|---|---|
| 762,776 | 12/1953 | Great Britain ........... | 260/442 |

OTHER REFERENCES

Chemical Abstracts, Vol. 64– 11606(f), 1966 B. L. Damron et al.

*Primary Examiner*—Norman Yudkoff
*Assistant Examiner*—Kenneth Van Wyck
*Attorney*—Robert L. Niblack

ABSTRACT: A nonagglomerating, nonsegregating premix for animal feeds comprising an intimate mixture of an active ingredient and a carrier. The active ingredient has dispersed upon the particles thereof a quantity of a first emulsifier equivalent to 0.1 to 1.0 percent by weight of the active ingredient, the emulsifier having an HLB value of at least 12. The carrier has dispersed upon the particles thereof a quantity of a second emulsifier equivalent to 0.1 to 1.0 percent by weight of the carrier and having an HLB value of 8 or less. The ratio of active ingredient to carrier in the premix can vary from 1 to 9 parts by weight to 4 to 1 parts by weight. Such premixes when blended with feed produce little if any electrostatic charge.

ANIMAL FEED PREMIX RESISTANT TO STATIC CHARGE AND METHOD OF MAKING SAME

DESCRIPTION OF THE INVENTION

Our invention relates to new and improved premixes for use in preparing animal feedstuffs, especially those intended for poultry and livestock. More particularly our invention relates to premixes that are remarkably free from static electrical charge.

In its most salient aspects, our invention pertains to a process for preparing novel premix compositions that comprise an active ingredient such as a growth promotant, a supplementary or trace nutrient, such as a vitamin or a mineral, and both therapeutic and prophylactic drugs, admixed with a diluent referred to herein as a carrier.

The use of premixes for introducing small but vitally significant active ingredients as additives into animal feed has become a standard practice. These additives not only increase yield, but also sometimes present the only practical way of obtaining long-term medication. Preparation of an animal feed containing such additives is usually accomplished in multiton quantities, where the usual cereal grain feeds are blended with one or more feed additives. The blending can be done either by a supplier of bagged or bulk feeds usually sold under a trademark, locally by a feed and grain dealer compounding feed for specific orders, or directly by the large-scale consumer whose scale of operation justifies having his own blending equipment.

Unfortunately in all these operations the feed additive in the premix, necessarily being finely powdered, is subject to dusting and the concomitant generation of static electricity during blending operations. Often when the premix is blended with the feed, the feed additive would heretofore become so highly charged ($>0.0\times10^{19}$ coulombs 1 gram) that some would remain adhered to the walls of the blending chamber following blending thereby resulting in a deficiency of additive in the feed, and defeating any attempt to obtain a guaranteed analysis. Also such adhered additive tends to build up on the walls of the blender, later sluffing off into subsequent blends as the charge dissipates. Thus shortages can be obtained in some batches and overages or contamination in others.

To heretofore obtain the proper amount of additive in the finished feed required an accurate estimate of holdout on the blender walls. Yet even if estimated properly, the existence of static charge within a given batch leads to both agglomeration or layering of the additive within the feed, although the correct gross content of additive might be contained within the individual lot. The nonuniform distribution within a lot can result in increments having highly variable quantities of additive. This can lead to serious variations of administration throughout the herd or flock. Ideally, a feed additive prescribed at a level of 10 grams/ton of feed should also be present at a level of 5 mg./lb. of feed. Clearly, to even approach such uniformity requires careful and complete blending of premix and feed.

Therefore it is the general object of our invention to provide a premix that when blended with feed will result in a uniform blend that can successfully meet the tests for guaranteed analysis.

Another object of our invention is to provide a premix that has a low level of coulombic charge e.g., $<2.0\times10^{19}$ coulombs often approaching zero charge.

A still further object is to provide a process for preparing premixes for poultry and livestock feed that results in a product that can be uniformly blended with feed without the feed additive being subject to "fly away" or "static cling."

Other objects and advantages will be apparent from the following description of our invention.

Briefly stated, the objects of our invention are accomplished by the treatment of the additive component with a quantity of a high HLB emulsifier having a weight equivalent to 0.1 to 1.0 percent of the weight of the additive. The term HLB refers to the hydrophilic lipophilic balance of an emulsifier and is fully described and defined by W. C. Griffen in the *Encyclopedia of Chemical Technology*, 8: 117-154, 2d Edition (1965). The emulsifier used to treat the feed additive component of the premix must have an HLB value of at least 12 and preferably in excess of 15.

Separately, the carrier component of the premix is treated with a quantity of a low HLB emulsifier having a weight equivalent to 0.1 to 1.0 percent of the weight of the carrier and having an HLB value less than 8 and preferably less than 4. HLB values are accurate within a single unit as stated in the Griffen paper, so these values should be read as $\pm 1$. After the carrier and feed additive have each been separately treated, they are intimately blended together. Examples of suitable emulsifiers are set forth in the Griffen article, provided however the emulsifier selected is also acceptable to the Food and Drug Administration for use in agriculture. Acceptable emulsifiers are announced in the Federal Register e.g., §120.1001, Paragraph C and D, published Apr. 3, 1969. Examples of particularly well suited high HLB emulsifiers include the polyoxyethylene fatty acid and sorbitol esters such as polyoxyethylene sorbitan monostearate (Tween 60). Similarly, examples of a low HLB emulsifiers include the mono and di glycerides of fatty acids and sorbitan fatty acid esters e.g., Atmos 300. Application of the high HLB emulsifier can be by means of spraying it undiluted into an agitated mass of the additive having a particle size in the range 60–325 mesh (U.S. Standard Screen Series). Although this range is suitable, the more desirable range is 100–300 mesh and an average particle size of 200 mesh within this latter range being preferred. Although undiluted emulsifier is suitable, it is preferred, however, that the emulsifier be diluted with sufficient water so that when the mixture of aqueous emulsifier is added to the feed additive, a slurry forms. This results in more uniform coating of the particles of feed additive with emulsifier. The slurry is then dried, for example in a drum or cyclone dryer although spray drying is desirable. The treated feed additive is then milled and rescreened if necessary to the desired particle size.

If more rapid drying is desired, the water can be partially replaced with a water-miscible solvent such as ethanol or acetone.

The low HLB emulsifier can be sprayed directly onto the carrier, although dilution with an edible oil so as to obtain more even coverage is advisable.

The particle size of the carrier is advisedly within the range of 20–325 mesh, with a particle size in the range of 20 to 60 being preferred. Generally, the average particle size of the carrier should be larger than the additive. For example if the average size of the additive particles is 200 mesh, then the average size of the carrier particles should be 40 mesh. The now treated carrier is then remilled to a preferred screen size of mesh, the range 325–60 being acceptable, but not desirable.

When selecting emulsifiers it is desirable that the sum of the high and low HLB values be between 16 and 24. Exceptionally good results are achieved when the sum is between 19 and 21. In addition, best results are obtained when the sum of the quantities of high and low HLB emulsifiers in the finished premix is about 1 percent by weight of the premix.

After the carrier and additive or additives if two are to be included in a single premix have been treated with emulsifier, they are intimately admixed to form the finished premix. Blending in a drum mixed until uniform assays are obtained is suggested.

Among those additives particularly suitable for use with our invention are arsanilic acid, 3-nitro-4-hydroxyphenylarsonic acid, menadione, nicotinic acid, riboflavin, and the like, and in addition therapeutic and prophylactic doses of 2:1 such for example as sulfaquinoxaline and the nitrofurazones such as NF-180.

Among the carriers that are suitable are cereal grain carriers such as ground oats, rye, wheat or barley together with corn germ cake, corn germ meal, soybean oil meal, corn gluten feed, corn meal and corn cob fractions. The mineral carriers such as for example: dolomite, calcite or limestone are also suitable, a CaCO₃ carrier being especially recommended for menadione. In general byproducts of fermentation such as distiller's dried grains and solubles are not suitable if used alone, because of their high oil content, but use in conjunction with the previously mentioned carriers is acceptable.

The ratio of additive to carrier in the finished invention ranges from 1 part additive to 9 parts carrier to 8 parts additive to 2 parts carrier. (Iween The following examples in which all parts are by weight are given for the purpose of further illustrating this invention.

EXAMPLE 1

A drum mixer is charged with 800 lbs. of arsanilic acid having a particle size in the range of 100 to 300 mesh. With the mixer in operation, 4 lbs. of polyoxyethylene sorbitan monolaurate (Tween 21) having an HLB value of 13.3 dissolved in 30 gals. of water is sprayed into the mixer. The resulting slurry is thoroughly blended and then transferred to a cyclone dryer and the dried arsanilic acid, now treated with high HLB emulsifier, is stored for later use. The mixer is then charged with 3200 lbs. of corn germ cake having a particle size in the range of 20 to 60 mesh. With the mixer in operation 16 lbs. of sorbitan monopalmitate (Span 40) having an HLB value of 6.7, that previously has been liquified by heating and admixed with 2 gals. of coconut oil is sprayed into the mixer so as to obtain a uniform dispersion of the emulsifier over the corn germ cake particles. After thorough blending, the treated arsanilic acid is added to the mixer and blending continued until blending is complete and an intimate mixture obtained. The premix is then packaged.

EXAMPLE 2

A drum mixer is charged with 2000 lbs. of arsanilic acid having a particle size between 100 and 300 mesh, and an average particle size of 200 mesh. With the mixer in operation, 15 lbs. of polyoxyethylene sorbiton monostearate (Tween 60) is dissolved in 75 gals. of warm (30° C.) water and sprayed into the mixer. The resulting slurry is thoroughly blended and transferred to a cyclone dryer. The mixer is then charged with 2000 lbs. of corn germ meal having a particle size of from 20 to 60 mesh. With the mixer in operation, 5 lbs. of sorbitan monostearate (Arlacel 80) admixed with 1 gal. peanut oil is sprayed into the mixer to obtain a uniform dispersion over the corn meal particles. After thorough blending the treated dried arsanilic acid is added to the mixer and blending continued until a uniform mixture of additive and carrier is obtained.

EXAMPLE 3

A mixer is charged with 16 kg. of menadione having a particle size in the preferred range. To the operating mixer, 80 g. of polyoxyethylene sorbitan monopalmitate (Tween 40) is added by spraying so as to obtain uniform dispersal. A separate mixer charged with 1000 lbs. of NaHSO₄ stabilized calcite having a particle size in the range 20–60 mesh is agitated. To this mixer is added 5 lbs. of sorbitan trioleate (Span 85) so as to obtain uniform dispersal.

EXAMPLE 4

A drum mixer is charged with 200 lbs. of 3-nitro-4-hydroxyphenylarsonic acid having a particle size in the range of 100 to 300 mesh. With the mixer in operation, 1.5 lbs. of polyoxyethylene tridecyl ether (Renex 31) dissolved in 7 gals. of water is sprayed into the mixer. The resulting slurry is thoroughly blended and then transferred to a cyclone dryer and the dried acid, now treated with high HLB emulsifier, is stored for later use. The mixer is then charged with 2000 lbs. of soybean oil meal having a particle size in the range of 20 to 60 mesh. With the mixer in operation, 5 lbs. of sorbitan monooleate (Span 80) that previously has been liquified and admixed with three-quarter gal. of coconut oil is sprayed into the mixer so as to obtain a uniform dispersion of the emulsifier over the soy meal particles. After thorough blending, the treated acid is added to the mixer and blending continued until blending is complete and an intimate mixture obtained. The premix is then packaged.

EXAMPLE 5

A drum mixer is charged with 100 lbs. of nicotinic acid having a particle size in the range of 100 to 300 mesh. With the mixer in operation, 0.5 lb. of polyoxyethylene sorbitan monolaurate (Tween 21) dissolved in 4 gals. of water is sprayed into the mixer. The resulting slurry is thoroughly blended and then transferred to a cyclone dryer and the dried nicotinic acid, now treated with high HLB emulsifier, is stored for later use. The mixer is then charged with 900 lbs. of soy flour having a particle size in the range of 20 to 60 mesh. With the mixer in operation, 4.5 lbs. of sorbitan tristearate (Span 65) that previously has been liquified and admixed with 1 gal. of coconut oil is sprayed into the mixer so as to obtain a uniform dispersion of the emulsifier over the soy flour particles. After through blending, the treated nicotinic acid is added to the mixer and blending continued until blending is complete and an intimate mixture obtained. The premix is then packaged.

We claim

1. A premix for animal feeds comprising an additive selected from the group consisting of arsanilic acid, 3-nitro-4-hydroxyphenylarsonic acid, menadione, nicotinic acid, sulfaquinoxaline and the nitrofurazones and a carrier selected from the group consisting of ground oats, rye, wheat, and barley; soy flour; corn germ cake; corn germ meal; soybean oil meal; corn gluten feed; corn meal; corn cob fractions; dolomite; calcite; and limestone combined in ratios of from 1 part additive to 9 parts carrier to 4 parts additive to 1 part carrier, the particles of the additive having a size in the range of from 60 to 325 mesh and having dispersed thereon a coating consisting essentially of high HLB emulsifier equal in weight to 0.1 to 1.0 percent of the weight of the additive and having an HLB value $\geq 12$; the particles of the carrier having a size in the range of from 20 to 325 mesh and having dispersed thereon a coating consisting essentially of low HLB emulsifier equal in weight from 0.1 to 1.0 percent of the weight of the carrier, and having an HLB value $\leq 8$.

2. A premix according to claim 1 wherein the sum of the values for said high HLB emulsifier and said low HLB emulsifier is the in the range of from 16 to 24.

3. A premix according to claim 1 wherein the particle size of the additive is in the range of from 100–300 mesh and has an average particle size of approximately 200 mesh.

4. A premix according to claim 1 wherein the particle size of said carrier is in the range of from 20 to 60 mesh.

5. A premix according to claim 1 wherein said additive is 3-nitro-4-hydroxyphenylarsonic acid.

6. A premix according to claim 1 wherein said additive is arsanilic acid.

7. A premix according to claim 1 wherein said carrier is combined with distiller's dried grains and solubles.

8. A premix according to claim 1 wherein said high HLB emulsifiers are selected from the group consisting of polyoxyethelene sorbitan fatty acid esters, polyoxyethylene sorbital esters, polyoxyethylene acids and polyoxyethylene alcohols.

9. A premix according to claim 1 wherein said low HLB emulsifier is selected from the group consisting of mono- and di-glycerides of edible fats and fatty acids, sorbitan fatty acid esters and polyoxyethylene alcohols.

10. A premix according to claim 1 wherein said high HLB emulsifier has an HLB value greater than 15.

11. A premix according to claim 1 wherein said low HLB emulsifier has an HLB value of less than 4.

12. A method for preparing an animal feed premix comprising the steps of admixing an additive selected from the group consisting of arsanilic acid, 3-nitro-4-hydroxyphenylarsonic acid, menadione, nicotinic acid, sulfaquinoxaline and the nitrofurazones having a particle size in the range of 60–325 mesh and having a coating thereon of a high HLB emulsifier equal in weight to 0.1 to 1.0 percent of the weight of the additive and having an HLB value greater than or equal to 12; admixing a carrier selected from the group consisting of ground oats, rye, wheat, and barley; soy flour; corn germ cake; corn germ meal; soybean oil meal; corn gluten feed; corn meal; corn cob fractions; dolomite, calcite; and limestone having a particle size in the range of 20–325 mesh and having a coating thereon of mesh a quantity of a low HLB emulsifier equal in weight from 0.1 to 1.0 percent of the weight of the carrier and having an HLB value equal to or less than 8; combining said carrier and said additive in ratios of from 1 part additive to 9 parts carrier to 4 parts additive to 1 part carrier.

13. A method according to claim 12 wherein said high HLB emulsifier is first dissolved in sufficient water or water combined with water miscible solvent to form a slurry; said slurry being subsequently dried prior to combining the treated additive with the carrier.

* * * * *

UNITED STATES PATENT OFFICE
CERTIFICATE OF CORRECTION

Patent No. 3,617,299          Dated November 2, 1971

Inventor(s) Richard W. Mattoon & Lowell R. Macy

It is certified that error appears in the above-identified patent and that said Letters Patent are hereby corrected as shown below:

Column 1, line 35 please delete "1 gram" and insert --/gram--

Column 1, line 35 please delete ">0.0 x $10^{19}$" and insert -- >9.0 x $10^{-9}$--

Column 1, line 63 please delete ">2.0 x $10^{19}$" and insert -- >2.0 x $10^{-9}$--

Column 2, line 69 please delete "2:1" and insert --drugs--

Column 3, line 7 please delete "invention" and insert --premix--

Column 3, line 9 please delete "(Iween"

Signed and sealed this 26th day of December 1972.

(SEAL)
Attest:

EDWARD M. FLETCHER, JR.            ROBERT GOTTSCHALK
Attesting Officer                  Commissioner of Patents